United States Patent [19]

Rabinowitz

[11] 3,748,897

[45] July 31, 1973

[54] FUEL CONTROL DIAGNOSTIC UNIT

[75] Inventor: Charles M. Rabinowitz, Bloomfield, Conn.

[73] Assignee: Chandler Evans Inc., Hartford, Conn.

[22] Filed: Dec. 13, 1971

[21] Appl. No.: 206,998

[52] U.S. Cl. ................................................. 73/118
[51] Int. Cl. .......................................... G01m 15/00
[58] Field of Search ................... 73/117.3, 116, 118

[56] References Cited
UNITED STATES PATENTS
3,443,428  5/1969  Carlin et al. ........................ 73/117.3
3,181,353  5/1965  Brahm et al. ........................ 73/117.3
3,630,023  12/1971  Lazar et al. .................... 73/117.3 UX Primary Examiner—Jerry W. Myracle
Attorney—David S. Fishman and Roger A. Van Kirk et al.

[57] ABSTRACT

The quality of performance of an engine fuel control is measured by comparing actual fuel flow with computed limits of acceptable fuel flow. The comparison is made only for operational modes corresponding to the most probable departures from acceptable performance. Apparatus in accordance with the invention employs digital logic and is responsive to signals commensurate with the controlling input parameters to the control and to a signal commensurate with actual flow rate provided by the control.

13 Claims, 4 Drawing Figures

FUEL CONTROL DIAGNOSTIC UNIT

BACKGROUND OF THE INVENTION

1. Field of the Invention

The present invention relates to the testing and maintenance of mechanical and hydromechanical systems and particularly to the testing of engine fuel controls. More specifically, the present invention is directed to a diagnostic unit for automatically testing fluid flow regulator devices in the field. Accordingly, the general objects of the present invention are to provide novel and improved methods and apparatus of such character.

2. Description of the Prior Art

While not limited thereto in its utility, the present invention is particularly well suited for the field testing of hydromechanical fuel control devices of the type employed in gas turbine engine installations. Considering, for example, utilization of an engine-fuel control system in an aircraft, present field service procedures require that the "on line" fuel control be replaced with a spare whenever there is any indication of trouble in the system. If this replacement action restores proper system operation, then the original fuel control is known to be at fault and is returned to the manufacturer or other appropriate service organization for repair. If the failure symptoms continue despite the replacement of the fuel control, then the engine will be removed from the air frame and, together with the original and spare fuel controls, will be returned to a service depot. Considering the relative initial costs of the engine and control and the usual service expenses incident to overhaul work thereon, the above-described technique is economical even though it produces two premature fuel control unit removals for every engine unit failure since there are no premature removals of the engine. However, experience has shown that there is a relatively high ratio of prematurely removed fuel controls to the number of controls that have actually experienced failure.

As implicit in the above discussion, premature removal of fuel control devices from engines leads to unneeded control device overhaul and, therefore, high maintenance costs. The primary cause of premature control removal may be attributed to a lack of diagnostic tools on the service line which can be used to quickly pinpoint defects.

Diagnostic techniques which depend on the exact measurement of control performance have previously been thought to require complex signal processing and computation possible only with advanced digital computer equipment. Such computer equipment is complex and; because of its size, weight and cost; has not been employed. A further deficiency of prior art equipment which could be used to either test or monitor the performance of a fuel control is that such equipment provided output indications in the form of graphs or charts which required analysis by skilled technical personnel.

SUMMARY OF THE INVENTION

The present invention overcomes the above briefly discussed and other deficiencies of the prior art by providing a diagnostic technique for analyzing the performance of fluid flow regulation systems. The invention also provides apparatus for practicing the novel technique which is inexpensive, lightweight, small in size, reliable and which provides a simple direct indication of system performance without the necessity of analyzing charts and the like. Thus, in accordance with the present invention, a diagnostic unit is provided which responds only to "most probable" or "critical" performance degradation modes in the device under test. That is, the diagnostic unit of the present invention is designed to detect, in signals commensurate with certain sensed parameters, features or characteristics indicative of a "critical" failure of the test device. When such features are detected, the invention signals "failure" of the test device.

In the interest of furnishing a diagnostic unit having physical and cost characteristics which permit the unit to be utilized as "flight" equipment, the present invention responds only to those failure modes which occur frequently enough to provide a high probability of successful diagnosis. Restated, the present invention does not provide a "failure" signal commensurate with all departures from acceptable performance of a fuel control or other test device and thus the invention does not insure that the test device is performing within specifications.

In accordance with the present invention, the performance of a test device is "identified" by sensing the output of the test device or a system controlled thereby and comparing a signal commensurate with actual output with computed signals commensurate with the limits of acceptable performance. In the case of a diagnostic unit for a fuel control for a free turbine type gas turbine engine, it has been determined that control failure is most apt to occur during the start and steady state power modes. Accordingly, in response to inputs commensurate with power turbine and gas generator speed, signals commensurate with the upper and lower limits of fuel flow in the speed range of top crank speed to idle speed will be generated for comparison with the actual fuel flow. During this start mode, when the engine is under gas generator speed governor control and is accelerating from top cranking speed to idle speed, the failure of the actual fuel flow to fall within the computed boundaries will be an indication of fuel pump or metering valve failure. A failure of the measured fuel flow to fall within the computed boundaries when idle speed has been reached will provide an indication of failure of the gas generator governor. The diagnostic unit of the present invention also computes the boundaries of acceptable fuel flow during the power or steady state mode wherein the power turbine governor will be the principal control influence except during deceleration wherein the gas generator governor will override. During the power mode, the computed boundaries of acceptable fuel flow will be the minimum flow for minimum acceleration beyond idle and the upper bounds of deceleration fuel flow and also the upper and lower pounds of steady state fuel flow for power turbine ($N_s$) governing.

In accordance with the invention, each computed limit signal will have two states and, if the comparison of the computed boundaries with actual flow indicates a discrepancy, one of the limit signals will be caused to change state. Thus, the invention provides a digital output signal which varies under abnormal conditions to provide an indication of control failure. Through the use of appropriate holding circuitry, the failure and the conditions under which it was sensed are temporarily stored and displayed.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF A PREFERRED EMBODIMENT

Figure 1:
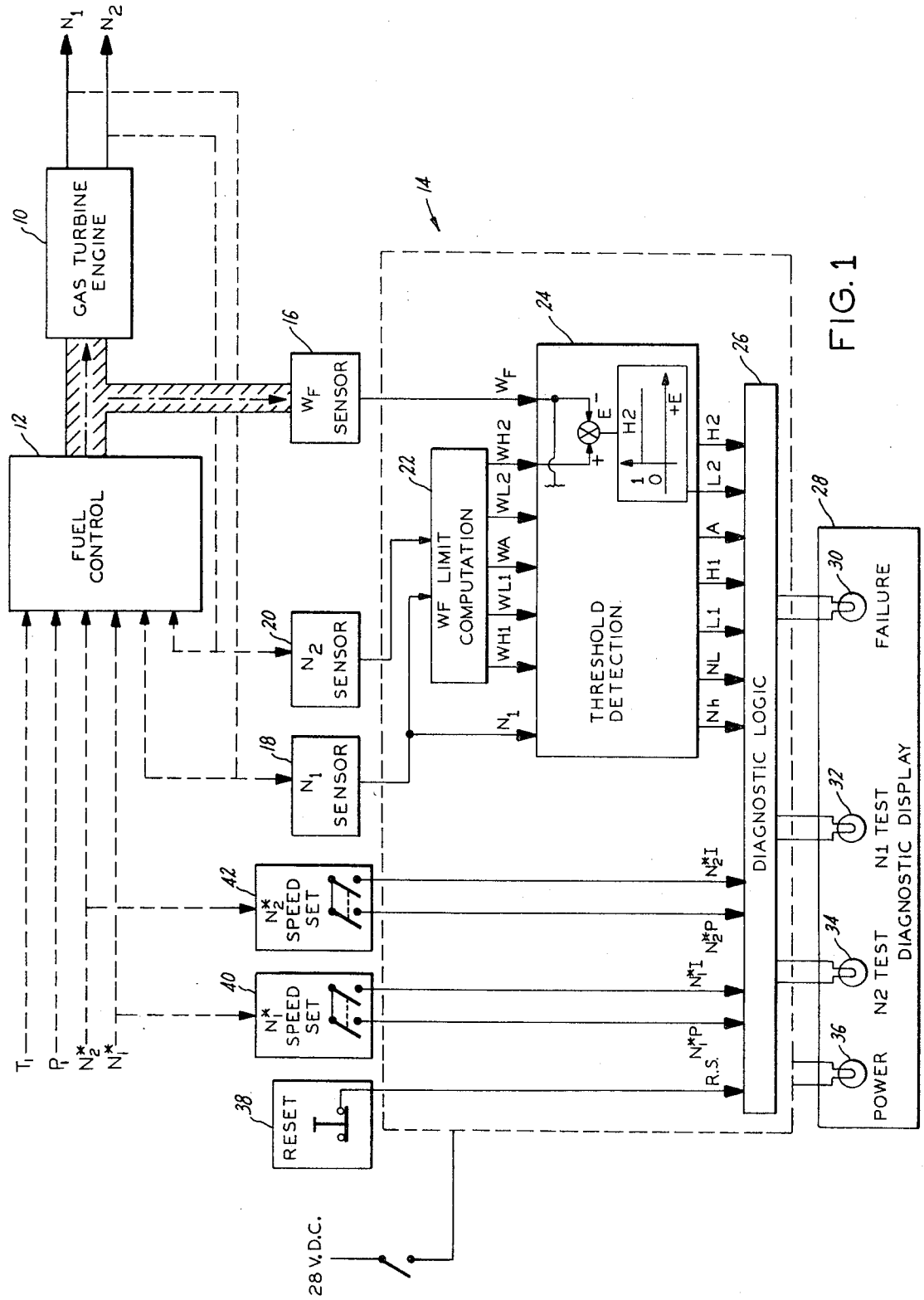
FIG. 1 is a block diagram of a threshold logic diagnostic unit in accordance with the present invention, the unit of FIG. 1 being shown in the environment of a test device for a gas turbine engine fuel control.

With reference now to FIG. 1, a gas turbine engine is indicated schematically at 10. Engine 10 will have associated therewith a fuel control 12 which will be the test device. Fuel control 12 will typically be a hydromechanical control having various fuel flow schedules built into the unit in the form of three dimensional cams and assciated cam followers. In accordance with the invention, certain engine and fuel control operating parameters are either set or sensed and electrical signals commensurate therewith are generated for application to the diagnostic unit, indicated generally at 14. As depicted in FIG. 1, the diagnostic unit of the present invention includes its own sensors. It will be noted, however, that the inputs to the diagnostic unit 14 could be derived from engine transducers which are available and are otherwise used to furnish various control and informational signals to an operator or pilot.

Metered fuel flow rate ($W_F$) to engine 10, as regulated by fuel control 12, is sensed by transducer 16 which provides an electrical output signal commensurate therewith. Transducer 16 may, for example, comprise a volumetric fuel flow sensor of a type well known in the art employing a turbine and pulse generator associated therewith.

Additional input signals for the diagnostic unit 14 are provided by a pair of speed sensors 18 and 20 which respectively generate electrical output signals commensurate with gas generator speed ($N_1$) and power turbine speed ($N_2$). In the example being described engine 10 will be a free turbine type engine and thus the speed of the power or free turbine and compressor of the gas generator are critical operational parameters. Sensors 18 and 20 will typically comprise conventional tachometers and associated signal processing circuitry.

In the manner to be described below in the description of FIG. 2, the $N_1$ and $N_2$ signals are employed, in a $W_F$ limit computation circuit 22 of diagnostic unit 14, to compute the upper and lower limits of $W_F$ for normal operation during start to engine idling and during $N_2$ governing. Computation circuit 22 is a function generator which computes the boundaries of the permissible fuel flow for the existing speed conditions. These limits or boundaries are generated as segmented straight functions of $N_1$ and $N_2$, as indicated in FIG. 3, by piece-wise linearization techniques. That is, computation circuit 22 comprises a plurality of piece-wise linearization circuits, which generate straight line curves, and associated diode gates for selecting the proper segments of those curves. The computed quantities $WH_1$ and $WL_1$ provide the upper and lower bounds on $W_F$ for normal start from top cranking speed to engine idling and for deceleration while the computed quantities $WH_2$ and $WL_2$ similarly set the upper and lower bounds on $W_F$ for normal operation during $N_2$ or steady state power governing. A $W_A$ signal, commensurate with minimum acceleration fuel flow expected from the control when the engine is being operated in the power mode, is generated and, together with the $WH_1$ signal, defines the operating region in which the power turbine governor normally controls the engine. This information is required by the diagnostic logic in order to determine unambiguously when $W_F$ should be scheduled by $N_2$.

The five computed $W_F$ limit signals, together with the signal commensurate with the actual measured value of $W_F$, are applied to a plurality of threshold detectors which comprise the threshold detection portion 24 of diagnostic unit 14. The $N_1$ signal from sensor 18 is also applied to threshold detection circuitry 24 and determines which set of curves control fuel flow for the existing speed condition. Detection circuitry 24 compares the measured $W_F$ with the appropriate $W_F$ limit or boundary as represented by the selected $W_F$ limit or boundary signals. The threshold detection circiuitry 24 provides a plurality of output signals L1, H1, A, L2 and H2 which are indicative of the comparison between actual and computed values of $W_F$. As indicated graphically within threshold detection circuitry 24 in FIG. 1, these five output signals may be switched between two states and the threshold detection circuitry thus provides an output signal in digital form commensurate with the results of the comparison. If the measured value of $W_F$ is lower or higher than the boundary signals to which it is compared, one of the outputs from detection circuitry 24 will be switched thereby providing a digital output commensurate with a failure condition. The threshold detection circutry 24 also provides, for the purpose to be explained below, a pair of output signals $N_h$ and $N_L$ respectively commensurate with the upper and lower bounds of the $N_1$ speed range in which the diagnostic unit is operational.

The seven threshold logic signals provided by detection circuitry 24 are applied as the inputs to a diagnostic logic circuit 26. Circuit 26, as will be explained in more detail below in the description of FIG. 2, comprises a plurality of interconnected NAND gates. If the comparison performed by threshold detection circuitry 24 indicates a probable failure in the test unit, in response to the digital input signal applied thereto logic circuit 26 will activate a failure lamp energization circuit. Once activated, the lamp energization circuit will remain latched in the on position until manually reset and will supply current for turning on a failure lamp 30 in a display panel 28. The logic unit 26 will also provide, via lamps 32 and 34, an indication of whether the failure detection occured during $N_1$ or $N_2$ governing. The display panel 28 is also provided with a pilot light 36 which indicates whether the entire diagnostic unit is receiving power.

Additional inputs to logic circuit 26 are provided by reset circuit 38 and speed set circuits 40 and 42. Reset circuit 38 provides, in the manner well known in the art, a signal of the proper polarity to cause unlatching of the energization circuit for failure lamp 30. Speed set circuit 40 comprises an $N_1$ set switch which is operated by a cam connected to the gas generator throttle. Set circuit 42 comprises an $N_2$ switch which is operated by a cam connected to the power turbine control lever.

Figure 2A:
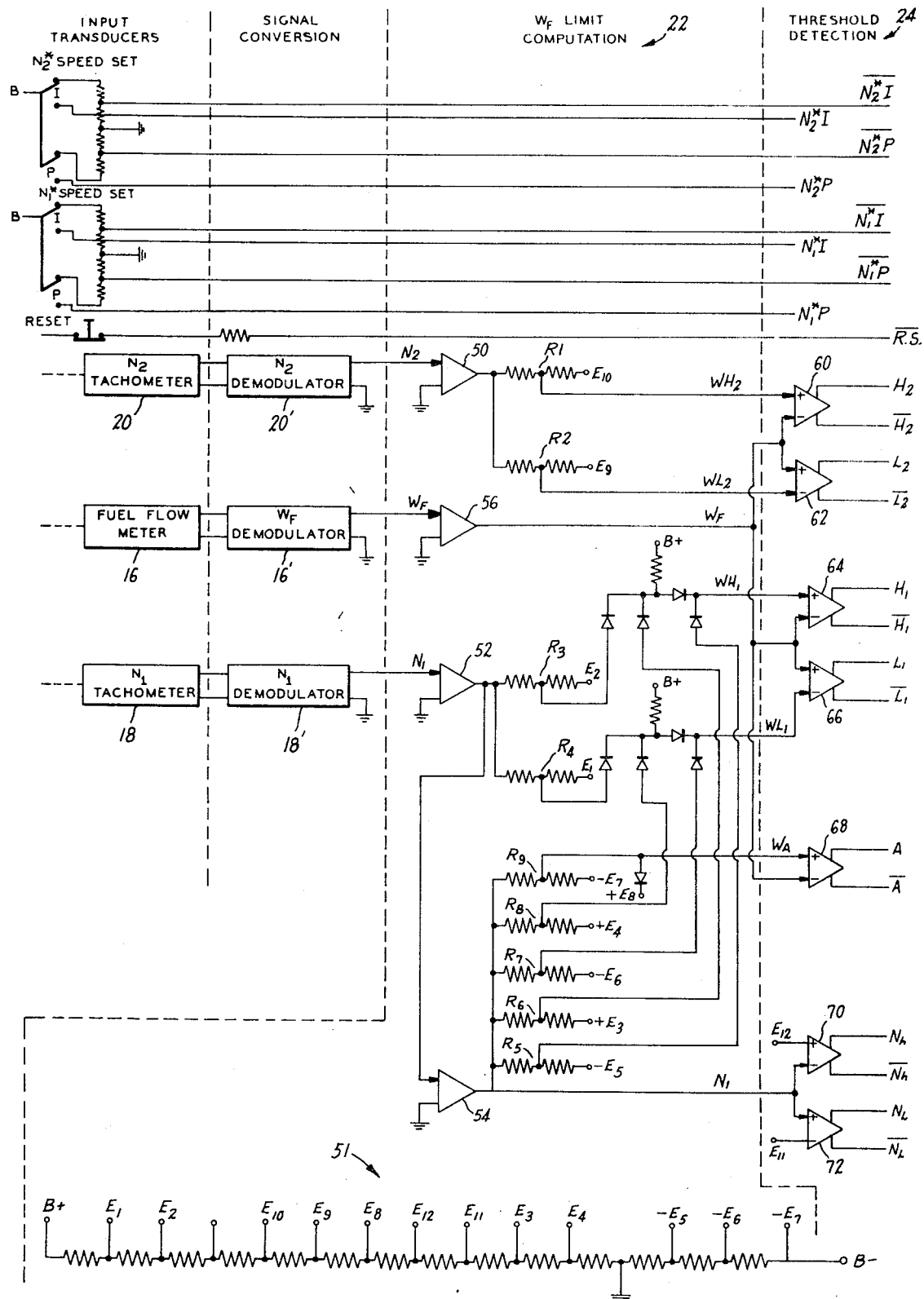
FIGS. 2A and 2B comprise a block diagram of the logic descision circuitry for the diagnostic unit of FIG. 1.
Figure 2B:
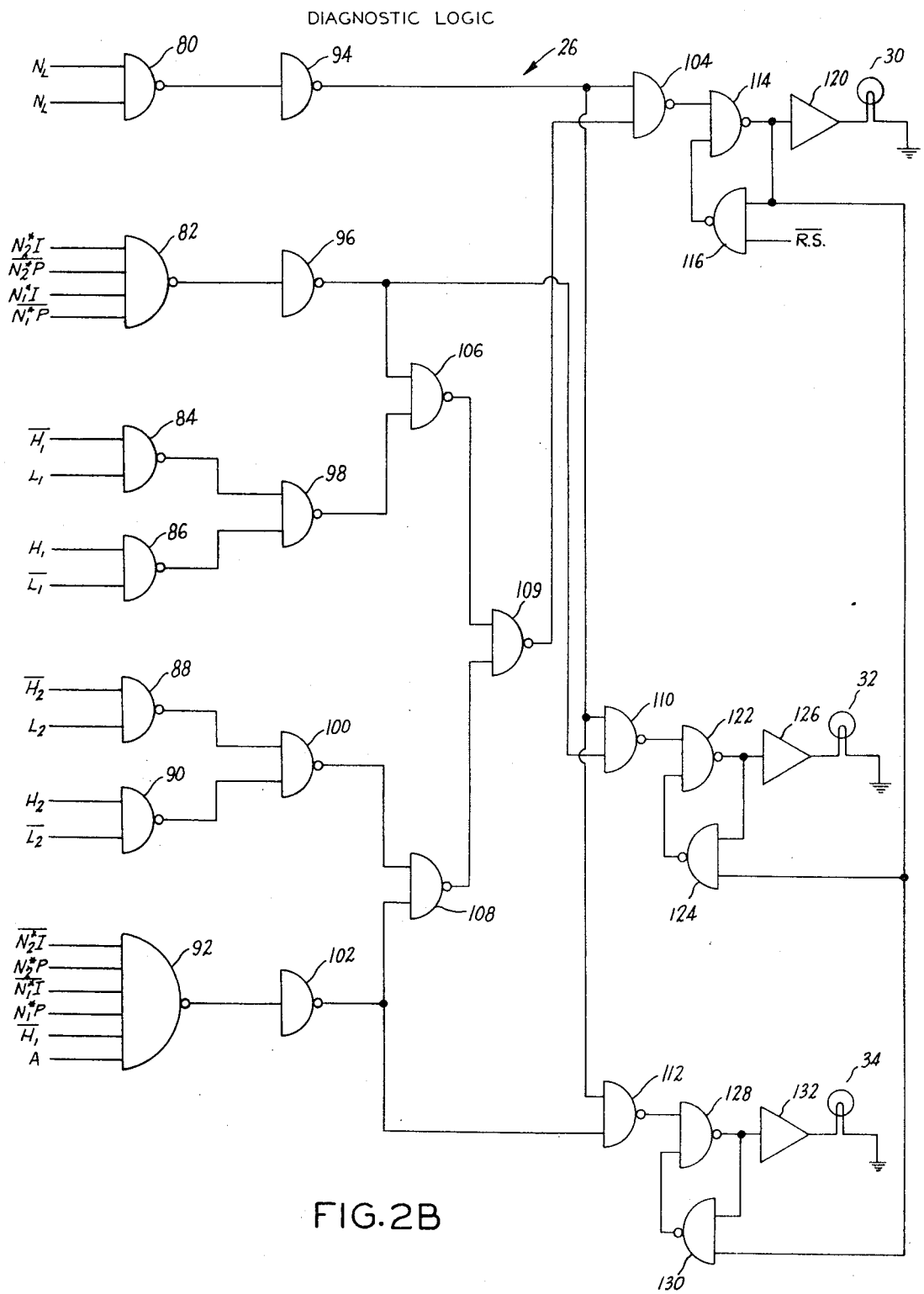
Figure 3:
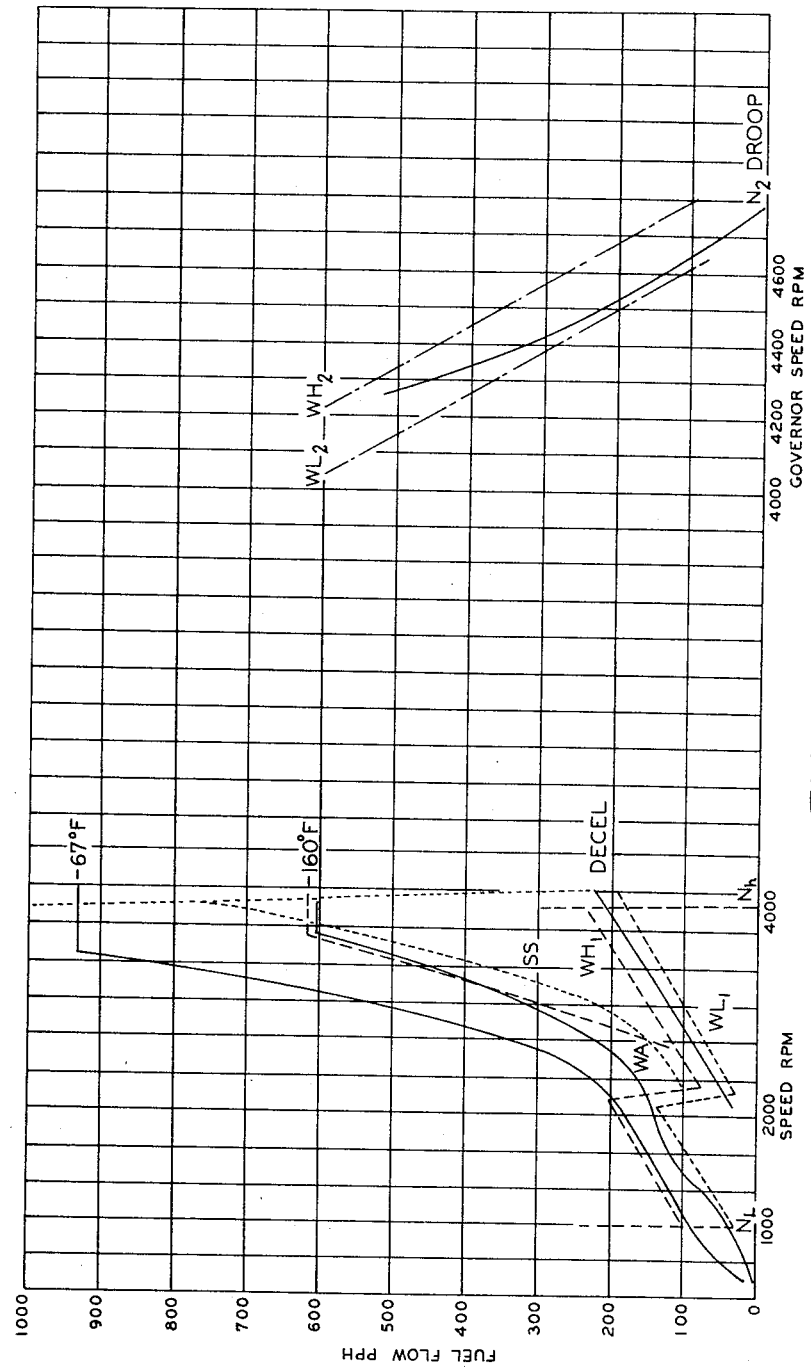
FIG. 3 is a graphical representation of actual fuel flow schedules with the flow limits or boundaries, which the present invention uses to determine if a boundary has been exceeded, shown.

Referring now to FIGS. 2A and 2B, a circuit block diagram of a preferred embodiment of the diagnostic unit of FIG. 1 is shown. The $F_W$, $N_1$ and $N_2$ sensors of FIG. 1 and their associated demodulators are shown in FIG. 2 under the headings "INPUT TRANSDUCERS" and "SIGNAL CONVERSION". The actual fuel flow meter 16 and tachometers 18 and 20 will typically provide alternating current output signals and thus respective demodulators 16', 18' and 20' will be employed to convert these signals to d.c. voltage levels commensurate with the quantities being measured. In addition, signals commensurate with the settings of the operators power levers are provided by $N_1$ and $N_2$ set switches 40 and 42 in the manner described above. Switches 40 and 42 will each provide a pair of output signals having two states and these states will be switched in accordance with the setting of the associated control lever. Thus, switch 40 provides digital output information indicative of whether the gas generator throttle is set in the $N_1*I$ (idle) position or in the $N_1*P$ (power) position. Similarly, the $N_2$ switch 42 provides output signals commensurate with the $N_2*I$ (idle) or $N_2*P$ (power) setting of the power turbine control.

The d.c. voltages commensurate with compressor speed $N_1$ and power turbine speed $N_2$, as furnished by demodulators 18' and 20' are applied to the $W_F$ limit computation circuit 22. As discussed briefly above, and as may be seen by reference to FIG. 3, the boundaries for fuel flow for both $N_1$ and $N_2$ governing may be approximated by straight line functions and thus limit computation circuit 22 comprises a plurality of piecewise linearization circuits. In the case of the $N_2$ limited valve of $W_F$, the signal from demodulator 20' is applied to a driver amplifier 50 and the amplifier output signal is applied to the first ends of a first pair of voltage dividers R1 and R2. Appropriate bias voltages, from adjustable source 51, are applied at the opposite ends of the voltage dividers and voltages which vary linearly with the $W_F$ limits for $N_2$ governing are tapped off of each of these voltage dividers. Because of the differences in the bias voltages, signals which vary with $N_2$ and are commensurate with the upper and lower limits of fuel flow, $WH_2$ and $WL_2$, are developed for application to the threshold detection circuitry 24.

The boundaries of the acceptable fuel flow rates under the $N_1$ governing condition are defined by somewhat more complex curves than $N_2$ boundaries. The $N_1$ signal from demodulator 18' is applied to a driver amplifier 52 and thence to a second pair of voltage dividers R3 and R4. The amplified $N_1$ signal is also applied to a second driver amplifier 54 and the output of amplifier 54 is applied both to five additional voltage divider circuits R5, R6, R7, R8 and R9 and to the threshold detection circuitry. As shown in FIG. 2A appropriate bias voltages are applied to the opposite ends of the seven voltage dividers to which the $N_1$ signals are applied from source 51. Six voltages which vary linearly with $N_1$ are tapered off voltage dividers R3-R8 and, in the manner well known in the art, segments of these linear voltages are selected through the use of diodes as shown so as to approximate the $W_F$ limits for $N_1$ governing in accordance with the curves shown in FIG. 3. The straight line $W_A$ function is generated by the seventh voltage divider R9; the maximum value of $W_A$ being selected with a diode biased by voltage E8 and the output signal being applied to threshold detection circuit 24.

The threshold detector 24 comprises seven identical differential amplifiers. The $WH_2$ and $WL_2$ signals are respectively applied to the positive and negative inputs of amplifiers 60 and 62. The $W_F$ signal from the fuel flow sensing circuitry will be amplified in amplifier 56 and applied to the negative input of amplifier 60 and the positive input of amplifier 62. If the measured value of $W_F$ lies between the boundaries established by the $WH_2$ and $WL_2$ signals, amplifier 60 will provide an output on its $H_2$ terminal and amplifier 62 will provide an output on its $L_2$ terminal. Should the actual $W_F$ exceed the $WH_2$ signal, amplifier 60 will be "switched" whereby the output will be removed from the $H_2$ terminal and applied to the $\overline{H}_2$ terminal. Similarly, if $W_F$ should fall below $WL_2$, amplifier 62 will be "switched" thus removing the output signal from the $L_2$ terminal and applying it to the $\overline{L}_2$ terminal. The differential amplifiers 64 and 66 which respectively have the $WH_1$ and $WL_1$ and $W_F$ signals applied thereto will similarly be switched depending upon the results of the comparison between the actual fuel flow rate and the computed rates for N1 governing. Under normal conditions, that is with $W_F$ within the accepted limits, amplifier 64 will provide an output on its $H_1$ terminal while amplifier 66 will provide an output on its $L_1$ terminal.

A $W_A$ signal and the $W_F$ signal are applied to differential amplifier 68 and the state of the output of this amplifier will be indicative of whether the device under test is operating in the acceleration or the deceleration-steady state mode. Thus, if $W_F$ is greater than the computed $W_A$ boundary, the output of amplifier 68 will appear on the $\overline{A}$ terminal thus indicating that operation is in the acceleration mode. If $W_F$ is less than the computed $W_A$ boundary, thereby indicating that the test device is operating in either the deceleration or steady state modes, the output of amplifier 68 will be switched to the A terminal.

The $N_1$ signal from amplifier 54 is applied to a further pair of differential amplifiers 70 and 72 wherein it is respectively compared with a pair of bias voltages $E_{12}$ and $E_{11}$. Bias voltages $E_{11}$ and $E_{12}$ are respectively commensurate with $N_h$ and $N_L$. As can be seen from FIG. 3, $N_1$ must be within the boundaries defined by $N_h$ and $N_L$ for the apparatus to be operating within the diagnostic range.

The states of the outputs of differential amplifiers 60–72; i.e., the threshold states; for various operating conditions are given below in tabular form. It is to be observed that, in discussing the threshold states, "1" indicates that the corresponding amplifier output terminal is in its "high" or "on" state. Similarly, a "0" indicates a "low" or "off" state. When neither a "1" or "0" is indicated the threshold logic signal may be either state. The threshold states or signals from threshold detector 24 are applied as inputs to the diagnostic logic circuit 26. Circuit 26 comprises a plurality of NAND gates and the threshold signals are applied as inputs to appropriate gates 80–92 as shown. The outputs of NAND gates 80–92 are applied to further NAND gates 94–102 and, in turn, the outputs of gates 94–102 are applied to further NAND gates 104–112. The means by which the signal lamps 30, 32 and 34 are energized in accordance with the threshold states will also be apparent from the tabulation below and it is believed unnecessary to otherwise trace the operation of the interconnected NAND gates which comprise logic circuit 26.

The energization circuit for each of signal lamps 30, 32 and 34 comprises a pair of NAND gates and a driver amplifier. Thus, the energization circuit for lamp 30, which operates in response to the output of NAND gate 104, includes NAND gates 114 and 116 and a lamp driver amplifier 120. Similarly, the energization circuit for lamp 32, which operates in response to the output of NAND gate 110, comprises NAND gates 122 and 124 and driver amplifier 126. The control circuit for lamp 34 comprises NAND gates 128 and 130 and driver amplifier 132; gate 128 being responsive to the output of NAND gate 112. Lamp 30 will be energized only in the event that a failure is detected and, once energized, lamp 30 will remain in the "on" condition unless its control circuit is reset via switch 38. Closing of switch 38 will apply a reset signal to NAND gate 116. Lamps 32 and 34 will be turned on and off during testing to indicate the operational mode and will be latched on by an output from NAND gate 114 upon the energization of failure lamp 30. This provides the operator with an indication of the operational mode under which the detected failure occurred. The resetting of the energization circuit for lamp 30 will simultaneously cause resetting of the circuit for whichever of lamps 32 and 34 has been latched on.

The diagnostic logic operates as follows:

which includes the regulator and a fluid consuming load coupled thereto, said apparatus comprising:

first signal generating means for sensing a first system parameter indicative of flow regulator performance and for generating a first electrical input signal commensurate therewith;

second signal generating means for sensing a second system parameter indicative of flow regulator performance and for generating a second electrical input signal commensurate therewith;

third signal generating means for sensing the regulator output flow rate and for generating a third electrical input signal commensurate therewith;

first function generator means connected to said first signal generating means and responsive to said first input signal for generating a set of signals commensurate with the upper and lower limits of acceptable regulator performance as a function of said first parameter;

second function generator means connected to said second signal generating means and responsive to said second input signal for generating a second set of signals commensurate with the upper and lower limits of acceptable regulator performance as a function of said second parameter;

means connected to said first signal generating means and responsive to said first input signal for generating a signal indicative of which of said first and second parameters is determining regulator performance limits;

| $N_1$ speed | Meas. $W_F$ | Operating condition | \multicolumn{11}{c|}{Threshold states} | \multicolumn{4}{c|}{Output lamps failure} | Mode No. |
|---|---|---|---|---|---|---|---|---|---|---|---|---|---|---|---|---|---|
| | | | $N_1$*I | $N_1$*P | $N_2$*I | $N_2$*P | $H_2$ | $L_2$ | $H_1$ | $L_1$ | A | $N_h$ | $N_L$ | RS | $N_1$ | $N_2$ | Pre | Post | |

START TO IDLE (THROTTLE SETTING I)

| $N_1$ speed | Meas. $W_F$ | Operating condition | $N_1$*I | $N_1$*P | $N_2$*I | $N_2$*P | $H_2$ $L_2$ $H_1$ $L_1$ | A | $N_h$ | $N_L$ | RS | $N_1$ | $N_2$ | Pre | Post | Mode No. |
|---|---|---|---|---|---|---|---|---|---|---|---|---|---|---|---|---|
| < $N_L$ | — | Crank up | 1 | 0 | 1 | 0 | | | 1 | 0 | 1 | 0 | 0 | 0 | 0 | 1 |
| > $N_L$ < $N_H$ | > $W_{L1}$ < $W_{H1}$ | Normal Accel/idle $W_F$ | 1 | 0 | 1 | 0 | 1 1 | 1 | 1 | 1 | 1 | 0 | 0 | 0 | 2 |
| | < $W_{L1}$ | Low Accel/idle $W_F$ | 1 | 0 | 1 | 0 | 1 0 | 1 | 1 | 1 | 1 | 0 | 0 | 1 | 3 |
| | > $W_{H1}$ | High Accel/idle $W_F$ | 1 | 0 | 1 | 0 | 0 1 | 1 | 1 | 1 | 1 | 0 | 0 | 1 | 4 |

POWER (THROTTLE SETTING P)

| > $N_L$ < $N_H$ | > $W_A$ | Accel. to 100% $N_1$ SPD. | 0 | 1 | 0 | 1 | 0 1 0 | 1 | 1 | 1 | 0 | 0 | 0 | 0 | 5 |
|---|---|---|---|---|---|---|---|---|---|---|---|---|---|---|---|
| | < $W_{H2}$ > $W_{L2}$ | $N_2$ Governor WHH Normal $W_F$ | 0 | 1 | 0 | 1 1 1 0 | 1 | 1 | 1 | 1 | 0 | 1 | 0 | 0 | 6 |
| | > $W_{H1}$ < $W_{L2}$ | $N_2$ Governor with Low $W_F$ | 0 | 1 | 0 | 1 1 0 0 | 1 | 1 | 1 | 1 | 0 | 1 | 0 | 1 | 7 |
| | > $W_{H2}$ < $W_A$ | $N_2$ Governor with High $W_F$ | 0 | 1 | 0 | 1 0 1 0 | 1 | 1 | 1 | 1 | 0 | 1 | 0 | 1 | 8 |
| > $N_H$ | — | $N_1$ Overspeed | 0 | 1 | 0 | 1 | | 0 | 1 | 1 | 0 | 0 | 0 | 0 | 9 |
| > $N_L$ < $N_H$ | < $W_{H1}$ > $W_{L1}$ | Normal Decel. $W_F$ | 1 | 0 | 1 | 0 | 1 1 | 1 | 1 | 1 | 1 | 0 | 0 | 0 | 10 |
| | < $W_{L1}$ | Low Decel. $W_F$ | 1 | 0 | 1 | 0 | 1 0 | 1 | 1 | 1 | 1 | 0 | 0 | 1 | 11 |
| | > $W_{H1}$ | High Decel. $W_F$ | 1 | 0 | 1 | 0 | 0 1 | 1 | 1 | 1 | 1 | 0 | 0 | 1 | 12 |

RESET (THROTTLE SETTING I/P)

| | | | | | | | | | | | | | | | |
|---|---|---|---|---|---|---|---|---|---|---|---|---|---|---|---|
| | | Failure Lamp Set to "ON" by Failure Mode. | | | | | | | | | | 1 | | 1 | 1 | 13 |
| | | Failure Lamp Reset to "OFF" in Non-Failure Mode Except Failure Modes. | | | | | | | | | | 0 | | 1 | 0 | 14 |
| > $N_L$ < $N_h$ | $W_F$ High or Low | Failure Lamp Set to "OFF" in Failure Mode (3, 4, 7, 8, 11, 12). | | | | | | | | | 1 | 1 | 0 | 1 | 1 | 15 |

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Apparatus for providing a qualitative analysis of the performance of a flow regulator in a fluidic system means connected to said first and second function generator means and to said third signal generating means for comparing said sets of limit signals with said flow rate signal and for producing a plurality of signals indicative of the results of the comparisons; and means connected to said comparing means and to said means for generating signals indicative of the parameter determining performance limits and responsive to the signals provided thereby for producing an output signal indicative of whether the regulator operation is within the limits of acceptable performance as determined by the controlling one of said first and second parameters.

2. The apparatus of claim 1 wherein at least one of said function generators comprises:
a pair of piece-wise linearization circuits.

3. The apparatus of claim 1 wherein said comparing means comprises:
a threshold detection circuit, said detection circuit including at least four bistable circuit means respectively responsive to one of said upper and lower limit signals and to said actual flow rate signal.

4. The apparatus of claim 3 wherein said regulator device is an engine fuel control and wherein said output signal providing means comprises:
logic circuit means responsive to the output signals provided by said bistable circuit means and to said signals indicative of the parameter determining performance limits for providing a pair of output signal levels respectively commensurate with acceptable and unacceptable performance; and
alarm means responsive to the output signal level of said logic circuit means commensurate with unacceptable performance.

5. The apparatus of claim 4 wherein said engine fuel control is a control for a gas generator including a free turbine and wherein said first and second monitored parameters are respectively gas generator speed and power turbine speed and wherein said first of said function generators comprises:
a pair of piece-wise linearization circuits.

6. The apparatus of claim 4 wherein said logic circuit means further provides output signals indicative of which of said first and second parameters is determining the regulator performance limits and wherein said output signal providing means further comprises:
indicator means responsive to the logic circuit means output signals indicative of performance limit determining parameter for providing an indication of which of said parameters is instantaneously controlling regulator operation; and
means responsive to the energization of said alarm means for locking said indicator means in the state in effect when unacceptable regulator performance was detected.

7. The apparatus of claim 6 wherein said engine fuel control is a control for a gas generator including a free turbine and wherein said first and second monitored parameters are respectively gas generator speed and power turbine speed and wherein said first of said function generators comprises:
a pair of piece-wise linearization circuits.

8. The apparatus of claim 1 wherein said regulator device is a fuel control for a gas turbine engine including a gas generator and a power turbine, said first and second monitored parameters are respectively gas generator speed and power turbine speed, and wherein said function generator means each comprises:
means for producing a pair of output signals which vary with the respective monitored parameter.

9. The apparatus of claim 8 further comprising:
means responsive to the input signals commensurate with gas generator speed for generating a signal commensurate with minimum acceleration fuel flow.

10. The apparatus of claim 9 wherein said comparing means comprises:
threshold detector means, said detector means including a plurality of bistable circuits each responsive to the flow rate signal and respectively responsive to the upper and lower limit signals and the minimum acceleration flow signal for providing 10 signals commensurate with the results of the comparison.

11. The apparatus of claim 10 wherein said comparing means further comprises:
means for comparing a signal commensurate with gas generator speed with steady state signals commensurate with the upper and lower control limits of gas generator speed in which the apparatus is operational for providing a plurality of signals indicative of whether the regulator is within the operating range of the apparatus.

12. The apparatus of claim 11 wherein said output signal generating means comprises:
logic circuit means responsive to the signals provided by said comparing means and to said signals indicative of the parameter determining performance limits for providing a pair of output signal levels respectively commensurate with acceptable and unacceptable performance; and
self-latching alarm means responsive to the output signal level of said logic circuit means commensurate with unacceptable performance.

13. The apparatus of claim 12 wherein said logic circuit means further provides output signals indicative of which of said first and second parmeters is determining the regulator performance limits and wherein said output signal providing means further comprises:
indicator means responsive to the logic circuit means output signals indicative of performance limit determing parameter for providing an indication of which of said parmaeters is instantaneously controlling regulator operation; and
means responsive to the energization of said alarm means for locking said indicator means in the state in effect when unacceptable regulator performance was detected.

* * * * *